United States Patent [19]
Yamakawa et al.

[11] Patent Number: 5,386,725
[45] Date of Patent: Feb. 7, 1995

[54] HEAT-SENSITIVE FLOW RATE SENSOR

[75] Inventors: Tomoya Yamakawa; Yuuji Kishimoto, both of Himeji, Japan

[73] Assignee: Mitsubishi Denki Kabushiki Kaisha, Tokyo, Japan

[21] Appl. No.: 110,961

[22] Filed: Aug. 24, 1993

[30] Foreign Application Priority Data

Aug. 28, 1992 [JP] Japan .................................. 4-229896

[51] Int. Cl.6 ................................................ G01F 1/68
[52] U.S. Cl. ................................ 73/204.21; 73/204.26
[58] Field of Search ........... 73/204.21, 204.25, 204.26, 73/204.27

[56] References Cited

U.S. PATENT DOCUMENTS

| | | | |
|---|---|---|---|
| 4,412,449 | 11/1983 | Eiermann et al. | 73/204.21 |
| 4,448,070 | 5/1984 | Ohyama et al. | 73/204.21 |
| 4,785,662 | 1/1988 | Ohta et al. | 73/204.21 |
| 4,864,855 | 12/1989 | Shiraishi et al. | 73/204.21 |

FOREIGN PATENT DOCUMENTS 84425 4/1991 Japan .

Primary Examiner—Herbert Goldstein
Attorney, Agent, or Firm—Sughrue, Mion, Zinn, Macpeak & Seas

[57] ABSTRACT

A heat-sensitive flow rate sensor in which a fluid shield is provided so as to cover at least part of a flow velocity probe disposed in a detecting tube, thereby preventing part of heat-sensitive resistor from being directly subjected to change in the flow velocity of a fluid. Temperature of the heat-sensitive resistor is maintained substantially constant even when the fluid flow rate has been drastically changed, thus providing good response characteristic of the flow rate sensor.

4 Claims, 3 Drawing Sheets

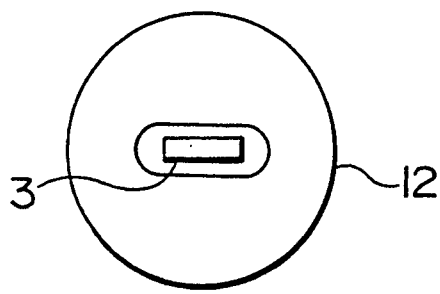
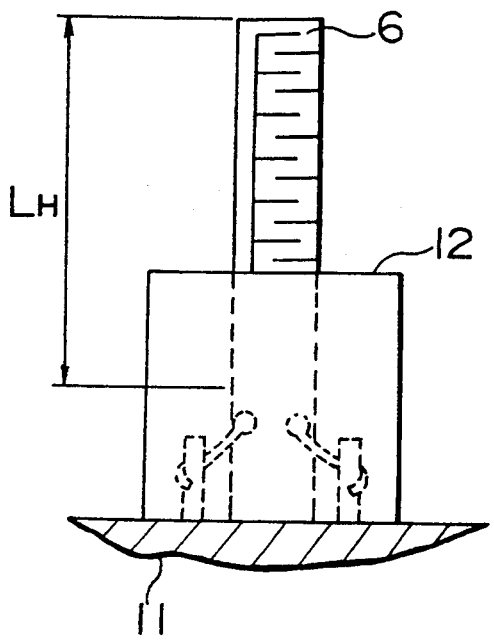
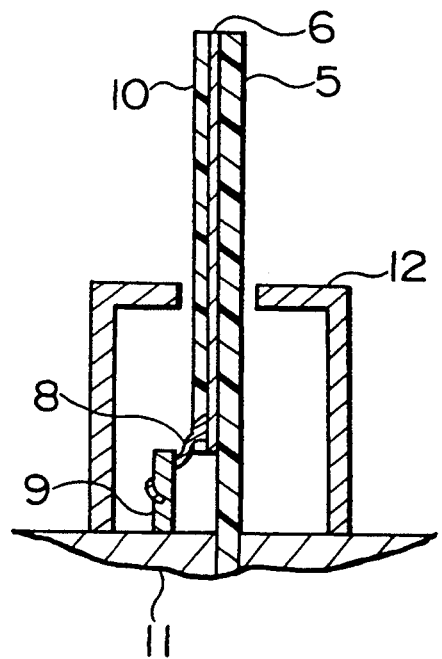
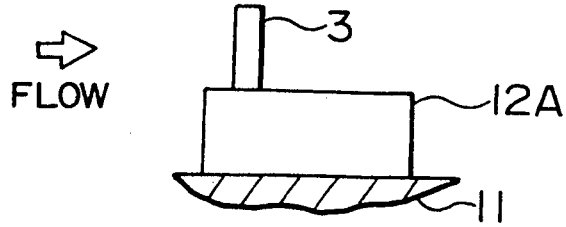

HEAT-SENSITIVE FLOW RATE SENSOR

BACKGROUND OF THE INVENTION

1. Field of the Invention

The present invention relates to a heat-sensitive flow rate sensor for use in measuring flow rate and flow velocity of a fluid and, more particularly, to a heat-sensitive flow rate sensor of the type which measures flow velocity and flow rate of a fluid-based on the rate at which heat is carried away from a probe by the fluid which flows in contact with the probe.

2. Description of the Related Art

In general, a heat-sensitive flow rate sensor is used as an intake air flow rate sensor which senses intake air flow rate in an automotive engine to provide air flow rate information to be used by an electronic fuel injector which controls the air-fuel ratio of a mixture to be fed to the engine. This type of sensor employs, as a flow velocity probe, a heat-sensitive resistor which generates heat by electrical power supplied thereto. The flow velocity of a fluid flowing in contact with this probe is measured based upon the rate of transfer of heat from this probe to the flowing fluid. Usually, a measuring circuit connected to the probe includes a bridge circuit and a differential amplifier which operate to control the electrical current supplied to the resistor so as to maintain the resistance of the resistor to a constant level, and the level of such electrical current is used as a signal indicative of the flow rate.

FIG. 6 schematically shows the construction of a known heat-sensitive flow rate sensor of the type which is disclosed in Japanese Patent Laid-Open No. 3-84425. A sensor tube 2, which forms a part of the fluid passage, is provided at a predetermined position in a housing 1 which defines a principal passage for the fluid. A flow velocity probe 3 including a heat-sensitive resistor as will be described later, as well as a fluid temperature sensor 4, is disposed at predetermined locations in the sensor tube 2. The flow velocity probe 3 and the fluid temperature sensor 4, together with resistors R1 and R2, form a bridge circuit. The junctions b and c of the bridge circuit are connected to a differential amplifier 101. The output of the differential amplifier 101 is connected to the base of a transistor 102. The transistor 102 is connected at its emitter to a junction a of the bridge circuit and at its collector to a power supply 103.

FIGS. 7A and 7B are a front elevational view and a side elevational sectional view of an example of the flow velocity probe 3 of the heat-sensitive flow rate sensor. Referring to these Figures, the flow velocity probe 3 has a substrate 5 made of an insulating material such as alumina. A heat-sensitive resistor 6 in the form of a film is provided on the substrate 5. The heat-sensitive resistor 6 is made of a material which varies its resistivity according to temperature. A patterning line wiring 7 is laid on the heat-sensitive resistor 6 so as to provide a path of electrical current. Lead lines 8 are connected to an end of the resistor 6. Each of the lead lines 8 is connected at its other end to the associated terminal 9 for connection to the electrical circuit. A protective coat 10 is formed on the heat-sensitive resistor 6 so as to protect the latter. The flow velocity probe 3 is held by a holder 11. The heat-sensitive resistor 6 generates heat over a vertical range thereof indicated by LH.

The operation of this known heat-sensitive flow rate sensor is as follows. When flow of a fluid at a constant flow rate exists in the housing 1, the bridge circuit is balanced in such a condition that the mean temperature of the heat-sensitive resistor 6 of the flow-velocity probe 3 is maintained at a level which is higher than the fluid temperature by a predetermined value. The mean temperature is maintained by controlling electrical current supply to the bridge circuit. This control is performed by a control circuit constituted by the differential amplifier 101 and the transistor 102. When the flow rate of the fluid increases, the cooling of the heat-sensitive resistor 6 is enhanced so as to cause a change in the resistivity of the resistor 6. As a result an imbalance is caused in the bridge circuit. The control circuit then operates to increase the electrical current supplied to the bridge circuit. Consequently, the heat-sensitive resistor 6 is heated so that the mean temperature of the resistor 6 is elevated to the level exhibited before the change in the fluid flow rate, whereby the bridge circuit is balanced again.

The heat generated by the heat-sensitive resistor 6 is not only carried away by the fluid but also is dissipated through the support substrate 5. Since the proportion of the heat dissipated through the substrate to the total heat generated by the heat-sensitive resistor 6 varies according to the flow velocity of the fluid, the temperature distribution over the holder 11 and the flow velocity probe 3 is varied according to the flow velocity. Therefore, when the flow rate of the fluid is drastically changed, the control circuit performs a transient control operation, thus failing to produce correct output, until a steady temperature distribution is recovered.

In order to overcome this problem, a proposal has been made in, for example, Japanese Patent Laid-Open NO. 2-264822, in which an additional heat generating body is provided in the vicinity of the boundary between the fixing portion of the sensor and the portion where the heat-sensitive resistor is formed. This proposal, however, inconveniently requires a flow velocity probe of a complicated construction and necessitates an operation for controlling the rate of heat generation from the additional heat generating body.

Thus, the known heat-sensitive flow rate sensor of the type described could not well respond to rapid change in the flow velocity. Improved sensor having an additional heat generating body undesirably requires complicated probe structure and control system and, hence, cannot be produced at low cost.

SUMMARY OF THE INVENTION

Accordingly, an object of the present invention is to provide a heat-sensitive flow rate sensor which excels in response characteristic and which can be produced at a low cost, thereby overcoming the above-described problems of the known art.

To this end, according to the present invention, there is provided a heat-sensitive flow rate sensor, comprising: a housing which defines a principal flow passage for a fluid; a detecting tube disposed at a predetermined position inside the housing; a flow velocity probe disposed in the detecting tube and provided with a heat-sensitive resistor; a fluid temperature sensor disposed in the detecting tube; resistors connected to the flow velocity probe and the fluid temperature sensor so as to form a bridge circuit; and a fluid shield which shields at least part of the flow velocity probe so as to prevent part of the heat-sensitive resistor from being directly subjected to fluid of varying flow velocity.

In the heat-sensitive flow rate sensor of the invention having the features set forth above, the temperature of the portion of the heat-sensitive resistor which is not directly exposed to the fluid flow of varying flow rate is maintained substantially constant, thus shortening the time until thermal equilibrium state is obtained.

BRIEF DESCRIPTION OF THE DRAWINGS

FIGS. 1A, 1B and 1C are a plan view, front elevational view and a sectional view of critical portions of a first embodiment of the heat-sensitive flow rate sensor of the present invention;

FIGS. 2A and 2B are a plan view and a front elevational view of a second embodiment of the heat-sensitive flow rate sensor in accordance with the present invention;

FIGS. 5a and 7b are a front elevational view and a side elevational view of a critical portion of a known heat-sensitive flow rate sensor.

DESCRIPTION OF THE PREFERRED EMBODIMENTS

First Embodiment

Figure 7A:
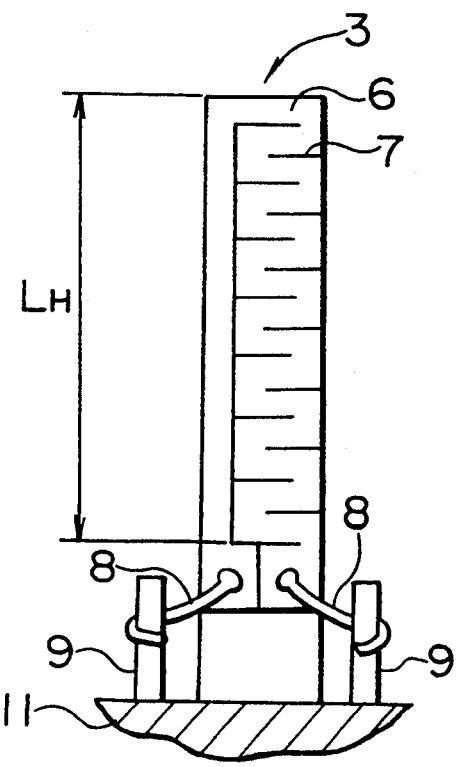
Figure 7B:
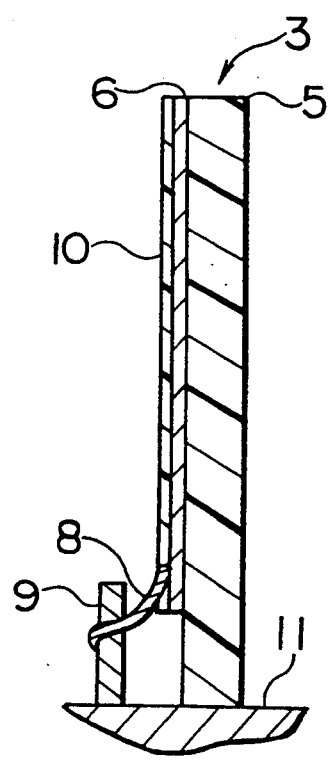

A first embodiment of the present invention will be described with reference to the drawings. Referring to FIGS. 1A to 1C, the first embodiment of the heat-sensitive flow rate sensor of the present invention has a substrate 5, heat-sensitive resistor 6, wiring 7, lead lines 8, terminals 9, protective coat 10 and a holder 11 which are substantially the same as those of the known flow rate sensor explained before in connection with FIG. 7. In this embodiment, the holder 11 is provided with a fluid shield 12 in the form of an inverted canister having an open end secured to the holder 11 and an opening on the opposite end through which the probe protrudes. The fluid shield defines a fluid space in which part of the heat generating portion $L_H$ of the flow-velocity probe is disposed. Thus, the above-mentioned part of the heat generating portion $L_H$ is not directly subjected to any change in the fluid velocity.

A description will now be given of the operation of this embodiment. The operation is basically the same as that of the known heat-sensitive flow rate sensor described before. In the first embodiment of the invention, however, it is to be noted that part of the heat-generating portion of the flow velocity probe 3 is disposed in a fluid space defined by the fluid shield 12 so that it is not directly subjected to the fluid flow of varying velocity. This part of the heat generating portion, which is not directly subjected to change in the fluid flow rate, exhibits reduced loss of heat due to forcible convection. In other words, the rate at which heat is removed from this part is much smaller than that at which heat is removed from the remainder part of the heat generating portion. Thus, the above-mentioned part which is not directly subjected to the change in the fluid velocity is maintained at a temperature higher than the temperature which would be obtained when the wind shield 12 is not provided. Therefore, the rate of heat dissipation from the supporting substrate 5 carrying the heat-sensitive resistor film 6 to the holder 11 is reduced even when a change has occurred in the fluid flow rate. Consequently, the thermal time constant, i.e., the time until a thermal equilibrium is obtained in the flow velocity probe 3 and the holder 11 is reduced.

Thus, even when the flow rate of the fluid is changed drastically, equilibrium state of temperature distribution over the parts of the sensor is achieved in a short time, thus offering high speed of response of the flow rate sensor to change in the fluid flow rate.

Second Embodiment

Figure 3A:
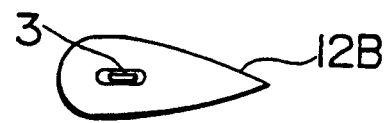
FIGS. 3A and 3B are a plan view and a front elevational view of a second embodiment of the heat-sensitive flow rate sensor in accordance with the present invention.
Figure 3B:
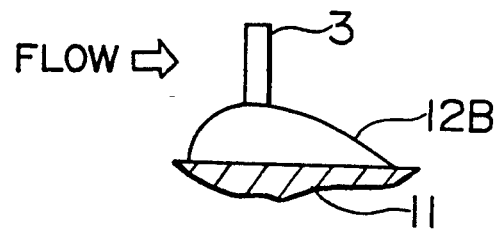
Figure 4:
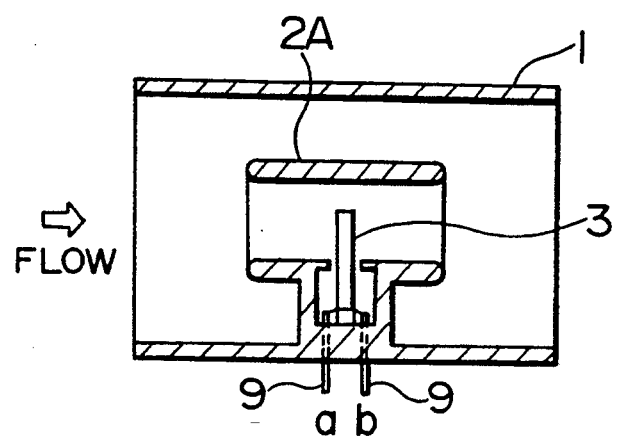
FIG. 4 is a sectional side elevational view of a third embodiment of the heat-sensitive flow rate sensor in accordance with the present invention.

FIGS. 2A, 2B and FIGS. 3A, 3B are illustrations of different forms of a second embodiment of the heat-sensitive flow rate sensor of the present invention. More specifically, FIGS. 2A and 3A are plan views of the flow velocity probes of these sensors, while FIGS. 2B and 3B are side elevational views of the same. In the flow rate sensor shown in FIGS. 2A and 2B, the fluid shield is streamlined as denoted by 12A, while, in the flow rate sensor shown in FIGS. 3A and 3B, the fluid shield is configured by three-dimensional curved surfaces as denoted by 12B, thereby preventing disturbance of the stream of the fluid. In these flow rate sensors, the flow of the fluid around the heat-sensitive resistor 6 is stabilized because generation of vortex flow of the fluid around the flow velocity probe is diminished, thus offering an advantage of improved S/N ratio in addition to the first embodiment described before.

Third Embodiment

In the second embodiment, the fluid space in which the flow velocity sensor is not directly subjected to change in the fluid velocity is defined by a fluid shield 12A (12B) which projects from the holder 11. In contrast, in a third embodiment of the heat-sensitive flow rate sensor of the invention, the fluid shield is formed in a stem portion of a detecting tube 2A which provides a passage for the fluid to be measured. In this embodiment, the flow of the fluid around the heat-sensitive resistor 6 is stabilized to reduce variation in the measuring output which otherwise would be caused by generation of vortex flow of the fluid around the flow velocity probe. Thus, the third embodiment provides an advantage in that the S/N ratio is improved, in addition to the advantages offered by the first embodiment.

Fourth Embodiment

Figure 5:
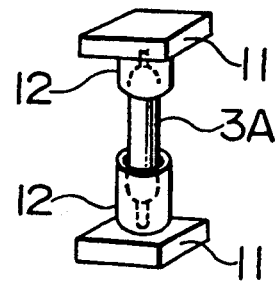
FIG. 5 is a perspective view of a critical portion of a fourth embodiment of the heat-sensitive flow rate sensor in accordance with the present invention.
Figure 6:
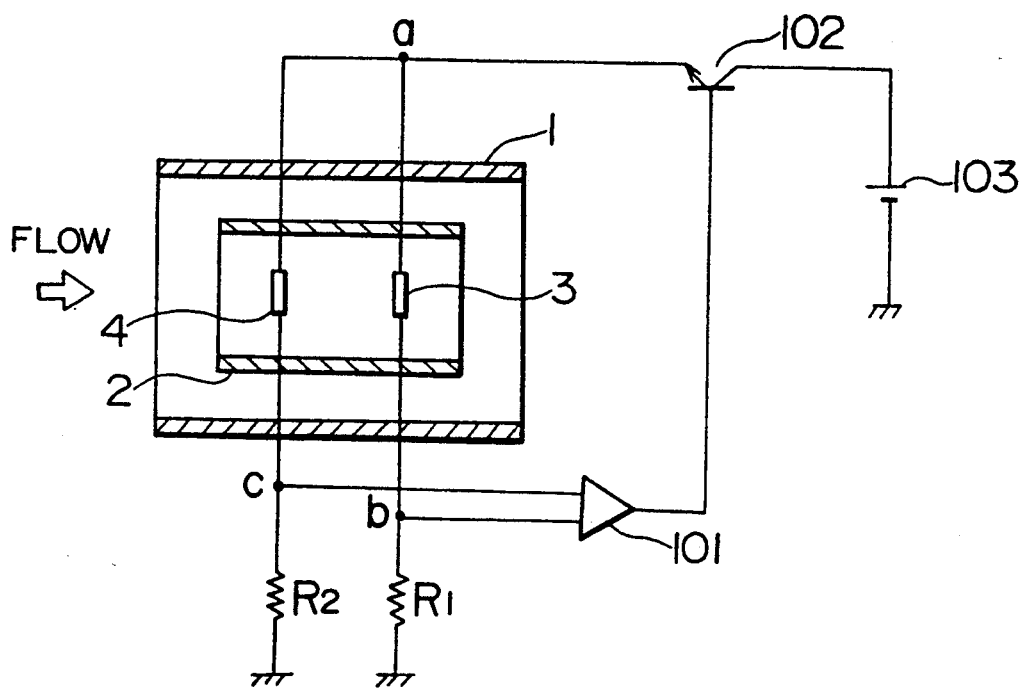
FIG. 6 is a schematic illustration of a heat-sensitive flow rate sensor.

In the third embodiment, a tubular cantilevered member is used as the supporting substrate for the flow velocity probe 3. The supporting substrate, however, may have a cylindrical form as denoted by 3A and may be supported at its both ends as shown in FIG. 5.

What is claimed is:

1. A heat-sensitive flow rate sensor comprising:
   a tubular housing which defines a principal flow passage for a fluid;
   a detecting tube disposed at a predetermined position inside said tubular housing wherein a longitudinal axis of said detecting tube is substantially parallel with a longitudinal axis of said tubular housing;

an elongated flow velocity probe disposed in said detecting tube and provided with a heat sensitive resistor;

a fluid temperature sensor disposed in said detecting tube;

resistors connected to said elongated flow velocity probe and said fluid temperature sensor so as to form a bridge circuit; and a fluid shield which shields a part of said flow velocity probe nearest the detecting tube so as to prevent an associated portion of said heat-sensitive resistor from being directly subjected to a fluid of varying flow velocity, wherein said fluid shield comprises an inverted canister having an open circumferential end secured to an inner wall of said detecting tube, and having an opening in an end opposite said open end, said flow velocity probe extending through the opening, a central axis of the opening being substantially perpendicular to said longitudinal axis of said detecting tube.

2. A sensor according to claim 1 wherein at least one surface of said fluid shield is streamlined in the direction of flow of said fluid.

3. A sensor according to claim 1 wherein a plurality Of surfaces of said fluid shield are streamlined in the direction of flow of said fluid.

4. A sensor according to claim 1 wherein all surfaces of said fluid shield are streamlined in the direction of flow of said fluid.

* * * * *